April 22, 1952  J. E. H. WESTBERG  2,593,638
EXPANSIBLE CLAMP ARBOR
Filed July 13, 1949
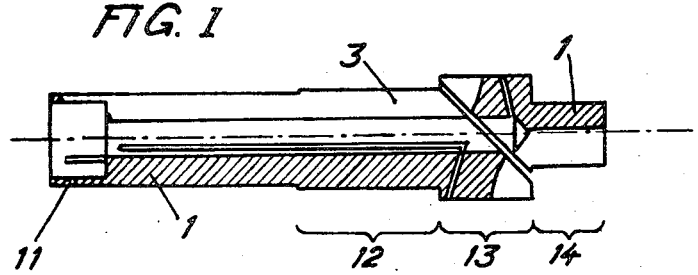
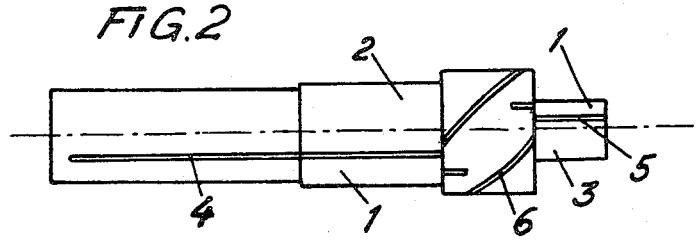
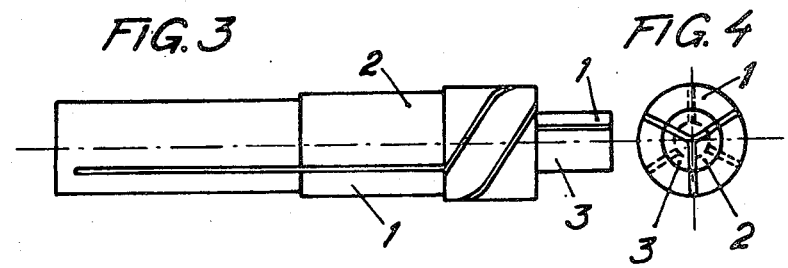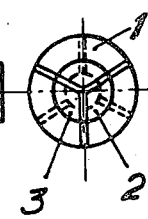
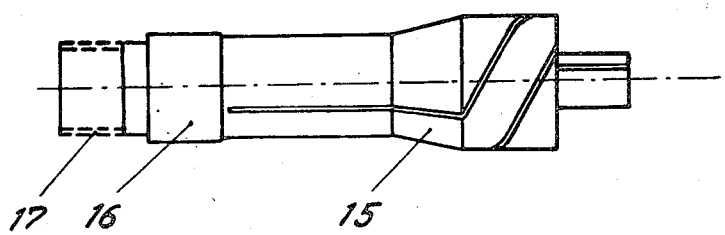
INVENTOR.
Johan E. H. Westberg
BY
his ATTORNEY

Patented Apr. 22, 1952

2,593,638

UNITED STATES PATENT OFFICE 2,593,638

EXPANSIBLE CLAMP ARBOR

Johan E. H. Westberg, Syracuse, N. Y.

Application July 13, 1949, Serial No. 104,510
In Sweden July 15, 1948

12 Claims. (Cl. 279—2)

When a workpiece is to be chucked internally in a machine tool, there are often no other means at one's disposal than to slide the workpiece upon an arbor machined to narrow tolerances. Such arbors will be expensive on account of the accuracy with which they must be manufactured, and as a rule they can be used only once without repeated machining, as the bores of the workpieces often vary too much even in the same series of manufacture. In order to facilitate the production, expansible clamp arbors may be used, but the types hitherto known have serious deficiencies, such as bad centering, great resiliency, liability to damage and expensive construction, etc. These disadvantages are eliminated if the arbors are constructed in accordance with the present invention. Further, in accordance with the invention, the arbors may be provided with a conical portion fitting directly in the taper of the machine tools intended for the conventional pin tongs or collet chucks, and the workpiece is clamped by the same action that normally clamps the workpiece in the pin tongs.

In the following the invention will be described more in detail in connection with the embodiments according to Figs. 1–5, but several other constructions can be considered as and falling within the scope of the invention as defined in the appended claims.

Fig. 1 shows a longitudinal section through the center line of an arbor embodying the invention, and Fig. 2 shows a plan view of the same. The pin 14 provides the work engaging portion of the arbor on which the workpiece is to be chucked, and the intermediate portion 12 provides the tool engaging portion for clamping the arbor in the machine tool by means of pin tongs, a chuck or the like. The arbor is slit to provide three members 1, 2 and 3 located around a common axis and which are held together by the peripherally continuous resilient rear portion 11. The slits are made in such a way that the slits will turn helically halfway around in passing the portion 13. According to Fig. 1 this turning is effected by rear slits 4 and fore slits 5 which are displaced 180° in relation to each other and connected through diagonal cuts 6 in the portion 13, and according to Figs. 3 and 4 the same result is arrived at by an arbor blank which is cut straight at the beginning, being twisted through half a turn before the hardening process while spacing plates are inserted in the slits. However, the arbor may also be produced from bars of section steel with sector shaped cross section. These bars are laid together and twisted 180° on a certain length or twisted or hammered separately to form helical jaw members. Thus three bars may be used the cross section of which is a sector having 120° center angle. The bars are connected with each other at one end before or after the twisting operation.

It is evident from the construction that a compression of the clamping or holding portion 12 will result in an expansion of the chucking pin 14 which will then clamp the workpiece. The construction may be made particularly non-resilient and stiff by locating the springy action at the rear portion 11 and connecting the rigid and non-resilient jaw members through this elastic part.

Finally Fig. 5 shows how the arbor can be carried out with a cone 15, guide 16 and threads 17 so as to fit directly in the collet socket of the machine, and the chucking of the workpiece is then effected by the cone 15 being compressed as the arbor is drawn backwardly through a tightening mechanism.

What I claim is:

1. An arbor for internally chucking a workpiece comprising a plurality of members arranged around a common axis, each of said members having a work engaging portion and a tool engaging portion for engagement wth a chuck or the like, the said portions of each member being connected by an intermediate portion in peripherally offset relation whereby compression of said tool engaging portions toward said axis by engagement with a tool causes expansion of said work engaging portions away from said axis to internally engage and chuck the work.

2. An arbor as set forth in claim 1 in which the tool engaging and work engaging portions of the respective members are offset to lie on opposite sides of a diametral plane through said axis.

3. An arbor as set forth in claim 2 in which the tool engaging and work engaging portions of the respective members are connected by a helical intermediate portion extending around approximately half the circumference of a circle.

4. An arbor as set forth in claim 1 having three members each provided with sector-shaped tool engaging and work engaging portions embracing included angles of approximately 120°.

5. An arbor as set forth in claim 1 including means providing pivot points about which said members are movable in radial planes passing through said axis.

6. An arbor as set forth in claim 5 in which said pivot points are axially spaced from the tool engaging portions on the side of the latter remote from the work engaging portions.

7. An arbor as set forth in claim 1 in which said members are connected at a place axially spaced from the tool engaging portions on the side of the latter remote from the work engaging portions.

8. An arbor as set forth in claim 7 in which the connection between said members is resilient.

9. An arbor as set forth in claim 1 in which the tool engaging portions of said members comprise conical surfaces for axially movable engagement with a holding tool to compress the members.

10. An arbor as set forth in claim 1 in which the outer surfaces of said tool holding portions and said work holding portions are cylindrically curved.

11. An arbor as set forth in claim 10 in which the outer surfaces of the tool holding portions and of the work holding portions of the assembly provide substantially complete cylinders, respectively.

12. An arbor for internally chucking a workpiece comprising a body of metal having a peripherally continuous end portion and a plurality of jaw members integral with said end portion and extending axially therefrom, said jaw members being peripherally separated by a first group of axially extending slots extending from a place adjacent to said end portion, a second group of axially extending slots axially spaced from said first group and a group of helically extending slots respectively connecting peripherally offset slots of said first and said second groups, whereby to provide jaw members having axially aligned and peripherally offset portions adapted respectively to engage a workpiece to internally chuck the same and to be engaged by a tool holding member to hold the arbor.

JOHAN E. H. WESTBERG.

REFERENCES CITED

The following references are of record in the file of this patent:

UNITED STATES PATENTS

| Number | Name | Date |
|---|---|---|
| 1,428,100 | Kahl | Sept. 5, 1922 |
| 1,957,235 | Simpson | May 1, 1934 |
| 2,105,618 | Silva | Jan. 18, 1938 |
| 2,176,071 | Hall | Oct. 17, 1939 |
| 2,282,674 | Pigott | May 12, 1942 |
| 2,282,676 | Pigott | May 12, 1942 |